Dec. 30, 1930.  E. C. ORR  1,786,959
INSERTED TOOTH FOR SAWS
Filed Dec. 10, 1928
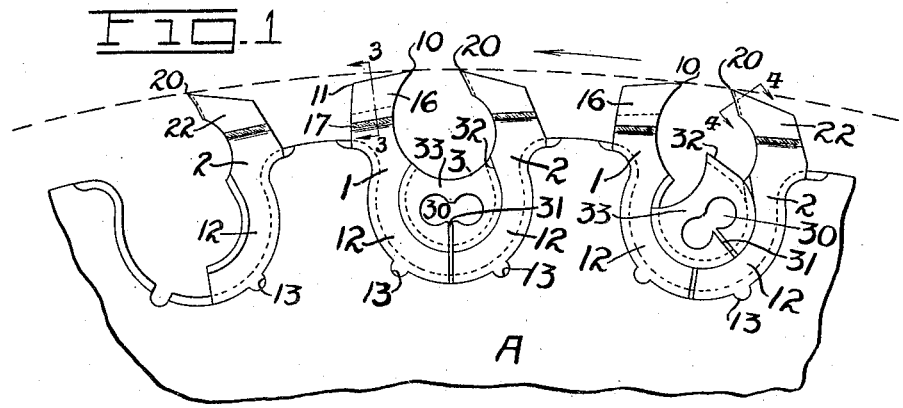
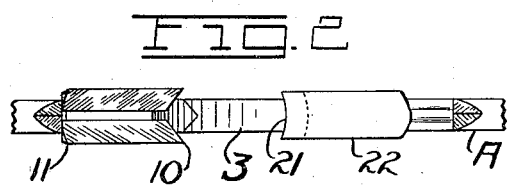
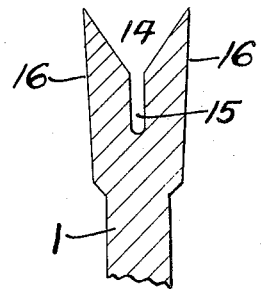
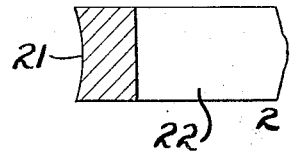
Inventor
*Elijah C. Orr*
By Reynolds & Reynolds
Attorneys Patented Dec. 30, 1930

1,786,959

UNITED STATES PATENT OFFICE

ELIJAH C. ORR, OF SEATTLE, WASHINGTON, ASSIGNOR TO ORR SAW TOOTH GRINDER CO., OF SEATTLE, WASHINGTON, A CORPORATION OF WASHINGTON

INSERTED TOOTH FOR SAWS

Application filed December 10, 1928. Serial No. 324,841.

My invention relates to inserted tooth saws, and consists of an improvement in the type of teeth employed, by the use of which teeth a superior job of cutting is possible, as well as making possible a higher rate of feed and also a wide variation in rate of feed without injuriously affecting the quality of work done.

My invention also comprises a new form of locking or holding member for inserted teeth, whereby the teeth are more firmly supported and held in place.

The object of my invention, broadly stated, is to provide inserted teeth which may be operated with a high or a low rate of feed, and at all ranges of speed will produce a higher quality of cut surfaces, and also of means for more firmly supporting inserted teeth in place.

In the accompanying drawings I have shown typical constructions in which have been incorporated the principles of my invention, and will describe these constructions and set forth the principles involved in the following specification, defining more particularly the features claimed in the claims terminating the specification.

Figure 1 shows a small segment of a saw center or body with my improved teeth therein.

Figure 2 is an outer edge view of a pair of teeth in place in a saw. Figure 3 is a section on the line 3—3 of Figure 1.

Figure 4 is a section on the line 4—4 of Figure 1.

In the drawings A represents a small segment of a saw body or center, designed to receive inserted teeth of my special type. This has, distributed about its periphery, a series of recesses of circular arcuate type, in which the arc exceeds 180° in extent. These recesses are each designed to receive and hold two teeth, which pair of teeth are of complemental type and differ in the shape and construction of their heads or outer ends. Together they form a cutting unit.

The shanks 12 of both teeth are, or may be, of like construction. They might also be of a different construction from that shown, although the latter is that which is preferred. The shanks 12, the contacting edges of the recesses in the saw body, and the edge of the locking or holding disk 3 are complemental channel and rib construction, which has become standard for such work whereby they are held in place. Each shank and the recess wall are also provided with complemental recess and projection, as 13, to prevent rotative movement between them, this also being standard construction.

Of the two teeth 1 and 2, the tooth 1 is a cutter tooth and 2 a raker tooth. That is, the function of tooth 1 is to cut across the wood fibers at the side margins of the kerf and of tooth 2 to separate and remove the fibers which have thus been cut across. The latter tooth may, in so far as its cutting end, be of a standard construction. Its cutting tip 20 should preferably extend well over the throat between the two teeth.

The cutter tooth 1 is special in its construction in several ways. The outer face of the head of this tooth is grooved lengthwise, as shown at 14 in Figure 3, thus forming two sharp cutting edges, one at each side of the head. A narrow slot 15 forms an inward extension of this groove to facilitate grinding and sharpening operations. The side cutting edges extend between points 10 and 11. These cutting edges are in parallel planes. The end 11 lies inside of the curved path traversed by the point 10, and as the point 11 is at the advancing end of the cutting edge, said edge acts to produce a draw cut for cutting across the wood fibers at the side margins of the kerf. The direction of revolution of the saw is indicated by the arrow in Figure 1.

The opposite side faces 16 of the head of tooth 1 are not parallel planes, although the cutting edges 10—11 are in parallel planes. The planes of the side faces converge slightly towards the center of the saw. In consequence, there is a slight clearance for every point in these cutting edges along the lines of revolution. For instance, if a circle of revolution be drawn through a point, as 11, it passes across the head of the tooth on a line in which the head is decreasing slightly in thickness. This produces a clearance which is enough to prevent development of heat by rubbing of the side faces 16 against the side wall of the kerf. In consequence the saw will not heat and "burn" if permitted to turn in a kerf without feeding the wood. The inclination of the side faces 16 is clearly shown in Figure 3.

The locking disk 3 is also of novel construction. It has central holes 30 adapted to receive a wrench or turning tool, and a slot 31 extending from these holes to the edge, so that there may be a slight compression. This slot, however, extends to the inner side of the disk opposite the center of the throat, rather than to the outer side, which latter is the usual construction. In the usual construction any unusual strain placed upon the tooth 1 would tend to press together the arms at each side of the slot 31, and thus permit a slight giving back of the tooth. Where the integral or un-slotted side is outward, as shown by me, a rigid bridge piece 33 is provided to resist the strain and there can be no giving back or yielding of the tooth, while, because of the slot 31 at the inner side of the disk, all the resiliency needed when inserting the teeth is secured. There is thus seen to be a big advantage in having the outer edge uncut over having it cut.

At the point 32, adjacent one corner of the locking disk, is a short section which is straight, or at least extends outside of the peripheral circle. The recess is complementally shaped. Contact of these sections provides a positive stop limiting the turning of the locking disk.

I prefer to make the advancing face of the tooth 2, or that immediately inward of the cutting tip 20, slightly concaved, as is shown at 21 in Figure 4. This gives a concaved cutting edge. Head 22 is thickened relatively to the shank.

It will be noted that the pair of teeth mounted in each recess form a complete cutting element. The tooth 1 cuts across the fiber at the edge of the kerf, and the tooth 2 removes the shaving. It may also be noted that the ruling or limiting points of the two teeth, namely points 10 and 20, are separated by only a very small arc. The relative projection, that is the radial distance from the center of revolution, of the two points 10 and 20 bear a relation to the rate of feed of the material being cut, and also upon the possibility of securing perfect work at widely varying rates of feed.

The ideal relation is that wherein the cutting teeth 1 cut to exactly the depth of the chip removed by the raker teeth 2. To secure this result, the points 10 of the cutting teeth must project radially an amount greater than that of the tooth point 20, equal to the advance or feed of the material during the time required for the point 20 to reach the position before occupied by the point 10. Where the rate of feed is slow the excess projection of point 10 need be but little, while with an increase of say four times in the rate of feed, the excess projection of point 10 would be increased four times.

It is obvious that the excess projection of point 10 required is in direct ratio to the arcuate or angular separation of points 10 and 20. It therefore follows that if these points are brought close together the excess projection of point 10 required for a given difference in rate of feed will be less than when these points are more widely separated.

To secure this result I have brought these points close together by extending the points over the throat and towards each other. In consequence a slight difference in the projection of the two points 10 and 20 will secure perfect operation results at all rates of feed without necessitating any appreciable overcutting by the cutting teeth during slow feeding.

This type of teeth is designed more particularly for cutting across the grain, that is, for use in a cut-off saw. By reason of the draw cutting action of the cutter teeth this saw will do wonderfully smooth cutting, having a surface comparable to that formed by a planing tool. It will in many cases enable the omission of a planing operation. It is not to be understood that it has no advantage except for cutting off. It will do smooth cutting of any and all kinds.

What I claim as my invention is:

1. A saw tooth having its peripheral edge centrally grooved lengthwise of its line of travel to form two parallel side-cutting edges, said cutting edges being inclined in a front to rear direction with their rear ends projecting farther than their forward ends to make a low angle with their direction of travel, whereby they produce a draw cut which smoothly severs the fibers at the side edges of the cut, said cutting edges having an overhang projecting rearwardly of the general axis of the tooth, and a raker tooth immediately succeeding said tooth and overhanging forwardly the gullet formed between the first mentioned tooth and the raker tooth.

2. An insertible tooth for saws having a shank adapted to be secured in a saw body, a thickened head grooved lengthwise in its outer edge to form two cutting edges at its side faces, said cutting edges being slightly inclined relative to the direction of movement of the saw with the rear end projecting farthest, the side faces adjacent to the cutting edges being inclined inwardly to thereby provide clearance, and the head extending rearwardly sufficient to project its outermost cutting point well over the throat in which the tooth is secured and a raker tooth immediately succeeding said tooth and overhanging forwardly the gullet formed between the first mentioned tooth and the raker tooth.

3. Insertible teeth for saws comprising pairs of teeth of which one is a shearing tooth and the other a raker tooth, said teeth having their outermost cutting tips overhanging the gullet between them to thereby bring the controlling tip of each raker tooth close behind the controlling tip of its companion shearing tooth.

Signed at Seattle, Washington, this 28th day of November, 1928.

ELIJAH C. ORR.